United States Patent [19]

Negus

[11] Patent Number: 5,121,405
[45] Date of Patent: Jun. 9, 1992

[54] ALIGNMENT CONTROL SYSTEM FOR LASERS

[75] Inventor: Daniel K. Negus, La Honda, Calif.
[73] Assignee: Coherent, Inc., Palo Alto, Calif.
[21] Appl. No.: 632,090
[22] Filed: Dec. 20, 1990
[51] Int. Cl.$^5$ .............................................. H09S 3/08
[52] U.S. Cl. .................................. 372/107; 372/29; 372/33; 372/98
[58] Field of Search ...................... 372/107, 33, 98, 29

[56] References Cited

U.S. PATENT DOCUMENTS

| 4,939,739 | 7/1990 | Hobart et al. | 372/107 |
| 4,953,176 | 8/1990 | Ekstrand | 372/107 |
| 4,972,424 | 11/1990 | Wissman | 372/107 |

FOREIGN PATENT DOCUMENTS 0222585  12/1983  Japan ..................... 372/107

Primary Examiner—Georgia Y. Epps
Attorney, Agent, or Firm—Limbach & Limbach

[57] ABSTRACT

Control systems for stabilizing the position of a beam from a laser are disclosed. In one aspect, lateral alignment deviations created by varying thermal effects in a solid state gain medium are compensated. A system is also disclosed which can isolate and the correct both lateral and angular alignment errors.

16 Claims, 2 Drawing Sheets

ALIGNMENT CONTROL SYSTEM FOR LASERS

TECHNICAL FIELD

The subject invention relates to a system for controlling the alignment of a laser beam.

BACKGROUND OF THE INVENTION

As the laser industry has evolved, the quest for optimizing the performance of existing lasers has intensified. There is a strong need for highly stabilized lasers in many fields. Investigators are particularly desirous of obtaining lasers which have stable power outputs as well as stable pointing or alignment characteristics. This stability is required both for direct experimentation as well as in the situation wherein the laser is used as an optical pumping source for another laser.

Some solutions to these issues are addressed in U.S. Pat. No. 4,939,739, issued Jul. 3, 1990 and incorporated herein by reference. The latter patent discloses a system for varying the alignment of a laser beam in order to maximize an operating parameter of a laser. In the embodiment disclosed therein, the power of the laser is optimized by varying the angle of one of the resonator mirrors which, in turn, varies the alignment of the laser beam. In another embodiment, variations in the position of the laser beam are corrected by varying the angle of one of the resonator mirrors.

The subject disclosure covers additional developments for position stability of a laser beam. One development disclosed herein is suitable for optically pumped solid state lasers. Referring to FIG. 1 there is illustrated a schematic diagram of a typical solid state laser 10. The laser 10 includes a resonator including convex mirror 12 and a concave mirror defining the output coupler 14. A solid state gain medium 16 (such as an Nd:YAG rod) is located within the resonator. A means, such as a flashlamp 18 or arc lamp, is provided to optically excite the gain medium.

In the latter type of solid state lasers, the energy from the flashlamp will tend to heat the gain medium creating a thermal lens in the rod. FIG. 2 illustrates the optical equivalent of the laser of FIG. 1 wherein the rod is replaced with a representation of the thermal lens 20 created due to the heating of the rod. If the rod is uniform and it is heated uniformly, the lens will not disturb the path of the beam. However, in the real world, uniformity is difficult to achieve. Thus, in operation, varying thermal gradients will develop which will result in the optical center of this effective thermal lens being laterally displaced. As the lens is displaced (illustrated in phantom line in FIG. 2), the alignment of the beam will be changed. As can be seen, there is an angular shift in the beam between mirror 12 and the lens and a lateral displacement of the beam at the output coupler 14. During operation, the thermal gradients will vary such that these misalignments will also vary.

The type of lateral misalignment of a beam described above can be quite detrimental. For example, translation of the beam can cause the mode to fluctuate. Further, if the laser is mode-locked, translation variations will effect the phase, pulse width and peak power of the beam. If the laser beam is used for second harmonic generation, changes in position of the beam in the doubler material will cause power variations in the second harmonic output.

Another application where this misalignment can be of critical importance is when the laser is used as a pump source in a system where highly stable, ultra short pulses are being created. Such a system is described in U.S. Ser. No. 07/381,969 U.S. Pat. No. 4,998,254 filed Jul. 18, 1989 and incorporated herein by reference. As noted in the latter patent, in order to optimize short pulse performance, it is necessary to stabilize the pump laser. In the system disclosed in the latter patent, the power of the pump laser is accurately controlled. It has also been found that short pulse performance can be further enhanced if variations in the lateral alignment of the laser beam, induced by varying thermal lens effects in the gain medium can be minimized. One aspect of the subject invention addresses such a control system.

In the above discussed laser system, thermal lens effects create variations in the alignment of the beam that are primarily lateral in nature at the output coupler. In other laser systems, variations in operating parameters will create both lateral and angular variations in the alignment of the beam at the output coupler. Both of these types of alignment variations will result in variations in the position of the beam outside of the resonator. In any case where both alignment variations effect beam position, the mere monitoring of beam position will not reveal the extent to which either of these two alignment effects is causing the change in beam position. Accordingly, it becomes difficult to correct for both lateral and angular errors unless these effects are isolated. It is another aspect of the subject invention to provide and approach for isolating and then compensating for both angular and lateral alignment variations.

SUMMARY OF THE INVENTION

In accordance with a first aspect of the subject invention, an approach is disclosed for compensating for lateral alignment variations in a beam created by varying thermal lens effects in a solid state gain medium. More particularly, a feedback system is disclosed wherein the variations in the position of the beam, outside of the resonator are monitored. These variations are then used to adjust the angle of one of the resonator mirrors of the laser to compensate for the lateral misalignment of the beam. By this arrangement, the position of the beam and thus many other operating parameters of the laser can be stabilized.

In another aspect of the subject invention, an approach is disclosed for monitoring variations in the position of the beam in a manner such that the separate effects of lateral and angular alignment deviations can be isolated. Once the separate effects are isolated they can be independently corrected. In the preferred embodiment, the angle of both resonator mirrors is varied to independently correct for both alignment errors.

Further objects and advantages will become apparent from the following detailed description taken in conjunction with the drawings in which:

DETAILED DESCRIPTION OF THE PREFERRED EMBODIMENTS

Figure 3:
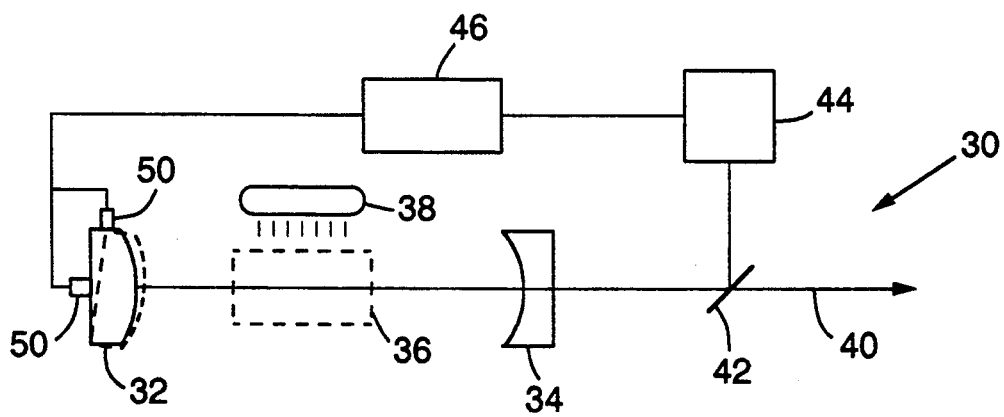
FIG. 3 is a schematic diagram, similar to FIG. 2, illustrating the alignment system of the subject invention.

Referring to FIG. 3 there is illustrated a laser 30 having a control system formed in accordance with the subject invention. Laser 30 includes a resonator defined by a convex mirror 32 and a concave mirror 34 functioning as the output coupler. A gain medium 36 (shown in phantom line) is located within the resonator. A flashlamp or arc lamp 38 is provided to optically excite the gain medium.

Figure 1:
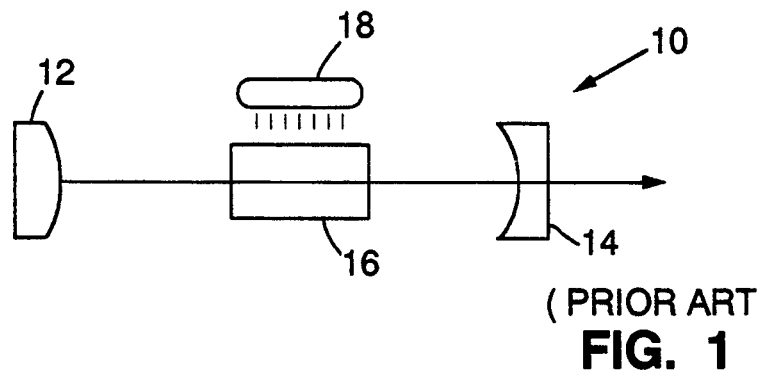
FIG. 1 is a schematic diagram of an optically pumped, solid state laser.
Figure 2:
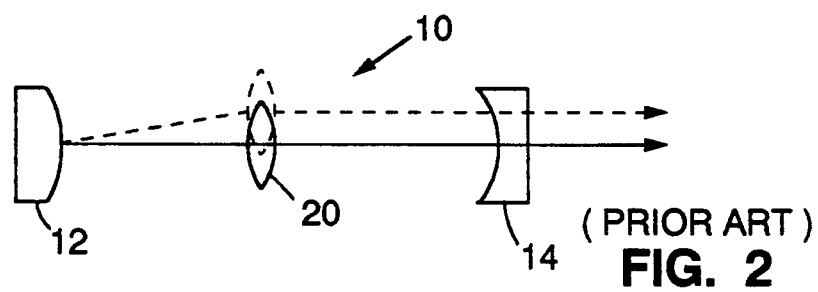
FIG. 2 is a schematic diagram of the laser of FIG. 1 wherein the thermal lens created in the gain medium is illustrated.

In this embodiment, gain medium 36 is of the type that will develop a thermal lens when heated. Most gain mediums will develop thermal lens effects to some extent. Moreover, during operation, one manifestation of these thermal gradients in the material will be a tendency to cause a lateral translation of the optical center of this thermal lens. This effective lateral shift in the thermal lens causes changes in the beam as illustrated in FIGS. 2 and 3. An angular change occurs between the gain medium 36 and mirror 32. A lateral displacement occurs with respect to the output coupler 34. As noted above, this lateral displacement was found to inhibit optimum short pulse performance in the las in U.S. Ser. No. 381,969, U.S. Pat. No. 4,998,254 cited above. In the later laser system, the gain medium of the pump laser was a Nd:YAG rod.

In order to improve short pulse performance, a control system was developed to correct for lateral alignment variations caused by the shifting thermal lens. More specifically, and as shown in FIG. 3, the control system includes a means for detecting variations in the position of the beam 40 outside of the resonator. A small portion of main output beam is redirected by a beam splitter 42 to a beam position detector 44. Beam position detector 44 is capable of generating a control signal indicative of the position of the beam on its surface.

Figure 4:
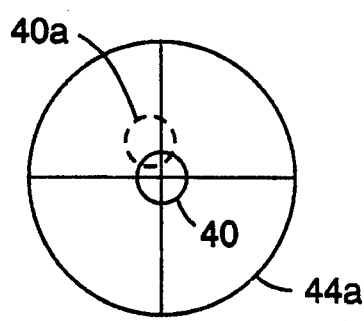
FIG. 4 is a plan view of one type of beam position detector.
Figure 5:
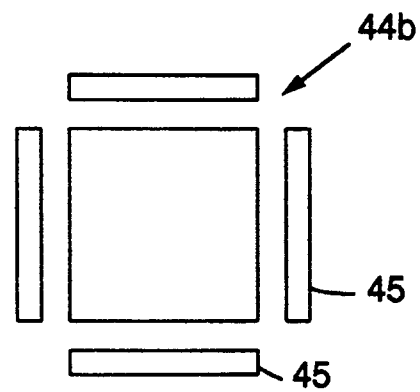
FIG. 5 is a plan view of another type of beam position detector.

FIGS. 4 and 5 illustrate two type of detectors which can generate a position signal. The detector 44a shown in FIG. 4 consists of four discrete photocell elements from which the current can be independently measured. When the beam 40 is centered on the detector, all four elements will generate the same photocurrent. If the beam moves off the center, (as shown in phantom line 40a), the differences in the current generated by the different elements can be used to determine the location of the beam.

FIG. 5 illustrates a planar diffused PIN photodiode 44b also sometimes referred to as a continuous dual axis position sensor. In this device, current is measured along four strips 45 surrounding the photocell surface. Variations in the current measured from the individual strips can be used to determine the location of the centroid of the beam on the detector. In an embodiment used to stabilize the pump laser in the system described in U.S Ser. No. 381,968, U.S. Pat. No. 4,998,254 a planar diffused photodiode was used because it had the proper sensitivity, noise response, surface area and speed.

The output signal from the beam position detector 44 is sent to a processor 46 to determine the extent of the lateral deviation. As noted above, in this particular laser, the geometry is such that any changes in beam position measured by detector 44 are primarily the result of the varying thermal lens and are therefore primarily lateral alignment errors. Accordingly, in this embodiment, the processor 46 will generate control signals designed to correct for the measured lateral alignment variations.

In the illustrated embodiment, the lateral alignment errors are compensated by changing the angle of one of the resonator mirrors. In this geometry, lateral alignment is varied by tilting the convex mirror 32. A pair of PZT crystals 50 are mounted to mirror 32 so as to provide orthogonal angular control of the reflective surface. The control signals from the processor are used to vary the angle of the convex mirror an amount necessary to correct for the lateral alignment errors. In order to prevent any changes to the length of the resonator as the angle of the mirror is adjusted, the mirror can be gimbal mounted. If simultaneous length control is desired, then a third PZT (not shown) may be added to the pivot position of a tilt plate upon which the mirror is mounted.

In the embodiment of FIG. 3, it was experimentally determined that the changes in the position of the beam were primarily a result in changes in the lateral alignment of the beam. Accordingly, measured changes in the beam position could be used directly to correct for lateral alignment errors.

In general, changes in the beam position can be the result of changes in both the lateral and angular alignment of the beam. In order to correct for these changes, the contribution of each error on the changes in beam position must be determined. One approach for isolating these effects is shown in FIG. 6.

Figure 6:
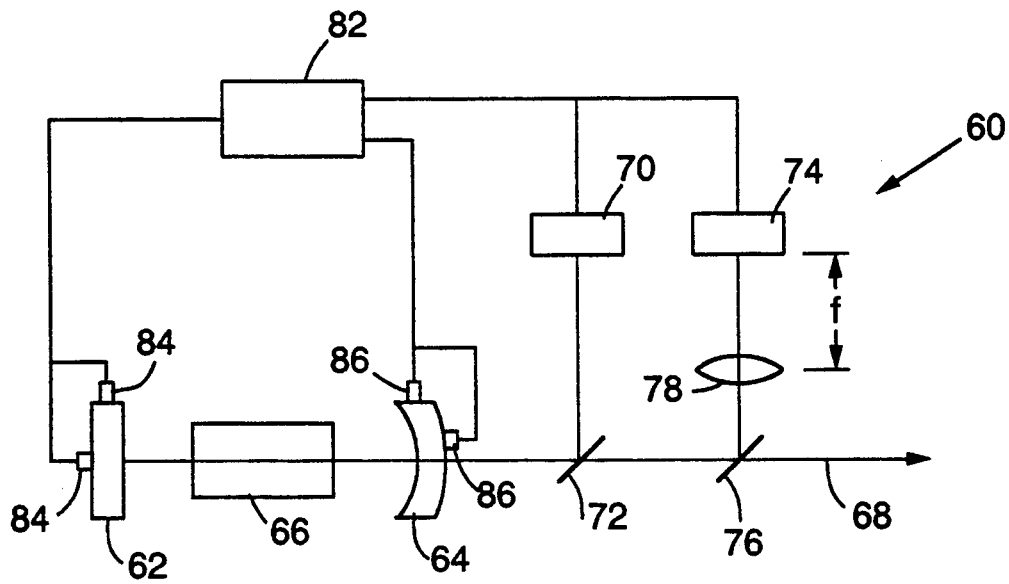
FIG. 6 is a schematic diagram of a laser incorporating another embodiment of the system of the subject invention which can independently correct for both lateral and angular alignment errors.

FIG. 6 illustrates a laser 60. Laser 60 includes a resonator defined by a plane mirror 62 and a meniscus lens output coupler 64. The inner concave surface of the output coupler 64 is partially transmissive and the outer convex surface is provided with an antireflection coating. The radius of both the concave inner surface and the convex outer surface is the same. A gain medium 66 is located within the resonator. Some means (not shown) for pumping the gain medium would also be included. This resonator structure is typical of that which is used in ion lasers.

Output beam 68 will be subject to positional variations due to various perturbations such as torsion of the resonator structure; thermal or mechanical drift or vibration of the mirror mounts; cooling fluctuations; magnet vibration from pumps; radiation induced lensing, etc. These perturbations will cause changes in both the lateral and angular alignment of the beam with respect to the output coupler.

In accordance with this embodiment of the subject invention, a means is provided to isolate the effects of lateral and angular alignment variations at either the output coupler or at some other remote location chosen to includes other optical elements such as extracavity beam steering mirrors. More particularly, a small portion of the beam 68 is redirected to a position detector 70 by beam splitter 72. Position detector 70 can be like the position detector discussed above with respect to FIG. 3. Any changes in beam position measured by this detector will be caused by both lateral and angular changes in the beam.

The detection system further includes a second position detector 74 which can be identical to detector 70. A small portion of the beam 68 is picked off by beam splitter 76 and redirected to detector 74 through a lens 78. The spacing between the lens 78 and detector 74 is equal to the focal length f of the lens at the wavelength of interest.

The geometry described above allows detector 74 to measure only changes in position resulting from angular deviations of the beam. This effect can best be appreciated by referring to FIGS. 7 and 8. More specifically, in FIG. 7 there is illustrated a beam 90 which enters the lens parallel to its optic axis but is laterally displaced. As can be seen, since the detector 74 is in the focal plane of the lens 78, a normally incident but laterally displaced beam will be focused on the center of the detector. In contrast, any beam which enters the lens at a non-normal angle will be displaced an amount proportional to the incident angle. As seen in FIG. 8, any ray impinging upon the lens 74 at an angle $\theta$ will strike the detector a distance $\delta$ away from the optical axis. This relationship is based on the following equation, where f is the focal length of the lens:

$$\theta = tan^{-1}(\delta/f) \approx \delta/f \tag{1}$$

Figure 7:
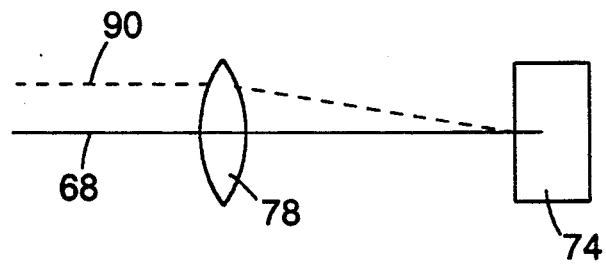
FIG. 7 is a schematic diagram of one of the detector arms of the embodiment illustrated in FIG. 6 demonstrating the geometry of beam that has been laterally displaced.
Figure 8:
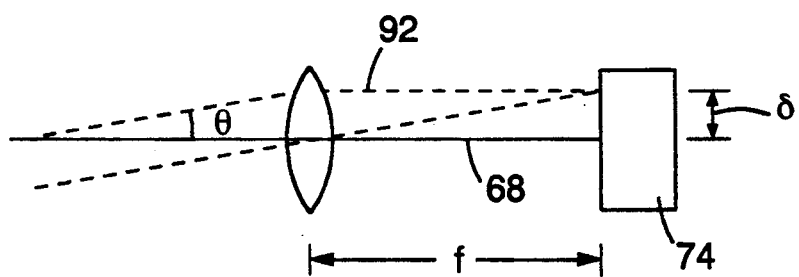
FIG. 8 is a schematic diagram, similar to FIG. 7, demonstrating the geometry of a beam that has been angularly displaced.

It should be noted that in the plane of the lens, the rays 90 and 92 shown in FIGS. 7 and 8 are displaced from the center line an equivalent amount. Thus, both have an equivalent position deviation at that plane and measuring that deviation alone would be insufficient to determine whether the alignment error was due to an angular or translational error. However, by using the proposed geometry, the effects of lateral misalignment can be cancelled while only measuring the effects of angular misalignment.

To properly isolate the extent of the angular deviation, the lens 78 and the image plane of the detector 70 should both be located the same optical distance from the output coupler of the laser. Thus, in the illustrated embodiment, the distance between splitter 72 and the detector 70 should be equal to the distance between splitter 72 and splitter 76 plus the distance between splitter 76 and lens 78. If this relationship is met, then the output from detector 74 can be used by processor 82 to correct for the angular displacement error.

As noted above, the resonator of laser 60 includes a planar mirror 62 and a concave mirror 64. The angular rotation of each mirror about two orthogonal axes is controlled by two pairs of PZT's, 84 and 86, respectively. In this resonator design, angular rotation of the concave mirror 64 will function to vary the lateral alignment of the beam at the output coupler. In contrast, the rotation of plane mirror 62 will alter the angular alignment of the beam at the output coupler. In addition, if the radius of curvature of the concave mirror is larger than the length of the resonator, then angular rotation of the plane mirror will function to vary both the lateral and angular alignment of the beam. The latter geometry is frequently found in an ion laser.

In order to correct for both types of alignment errors in the resonator shown in FIG. 6, the output of detector 74 is used in a fast feedback correction loop by processor 82 to vary the angular position of planar mirror 62. Since the output of detector 74 isolates the angular displacement error of the beam, its signal will be used to control the position of mirror 62, which is the only mirror that can effect and therefore correct the angular displacement errors. Aligning plane mirror 62 based on angular error information will also cancel any lateral deviation effects caused solely by that mirror.

Assuming the angular displacement errors are being corrected, any remaining alignment errors would be due to lateral translation errors caused by misalignment of mirror 64. Thus, the output of detector 70 can be used in a relatively slow feedback loop by processor 82 to vary the angular position of concave mirror 64 in order to correct the lateral deviation of the beam. As can be seen, using this approach, both the lateral and angular misalignment errors can be corrected.

As noted above, if the angular deviations in the beam are stabilized, the beam can be used for more accurate applications. Moreover, it has been found that stabilizing the beam also enhances performance of the laser.

In summary there has been disclosed a control system for stabilizing the position of a beam from a laser. In one aspect, lateral alignment deviations at the output coupler created by varying thermal effects in a solid state gain medium are compensated. A system is also disclosed which can isolate and correct both lateral and angular alignment errors.

While the subject invention has been described with reference to preferred embodiments, various changes and modifications could be made therein, by one skilled in the art, without varying from the scope and spirit of the subject invention as defined by the appended claims.

I claim:

1. A laser comprising:
    a resonator including a pair of mirrors;
    a solid state gain medium located within said resonator;
    means for exciting said gain medium to generate a laser beam;
    means for detecting variations in the lateral alignment of the beam due to varying thermal lens effects created in said gain medium; and
    means for compensating for said detected variations in the lateral alignment of the beam.

2. A laser as recited in claim 1 wherein said means for detecting variations in the lateral alignment of the beam includes a beam position detector located outside of said resonator.

3. A laser as recited in claim 2 wherein said beam position detector is defined by a quadrant photodetector.

4. A laser as recited in claim 2 wherein said beam position detector is defined by a planar diffused PIN photodiode.

5. A laser as recited in claim 1 wherein one of said mirrors is convex and the other is concave, and wherein said compensation means includes a means for varying the angle of said convex mirror.

6. A laser comprising:
    a resonator having a pair of mirrors;
    a gain medium located within the resonator;
    means for exciting the gain medium to generate a laser beam;
    means for detecting changes in position of said laser beam outside of said resonator, means for determining the extent of said position changes result from changes in either the lateral and angular alignment of the beam; and means for independently correcting for the changes in the angular and lateral alignment of the beam within the resonator.

7. A laser as recited in claim 6 wherein said means for detecting changes in position of the laser beam includes a pair of position detectors and a lens spaced from one of said detectors a distance equal to the focal length of said lens, such that changes in beam position measured on said one detector will be limited to those resulting from angular changes in the alignment of the beam.

8. A laser as recited in claim 7 wherein the distance between the laser and said lens is equal to the distance between said laser and the other position detector.

9. A laser as recited in claim 6 wherein said correcting means includes varying the angles of said mirrors and wherein the angle of one of said mirrors is varied to correct the angular alignment of the beam and angle of the other mirror is used to correct the lateral alignment of the beam.

10. A laser comprising:
a resonator having a pair of mirrors;
a gain medium located within the resonator;
means for exciting the gain medium to generate a laser beam;
means for independently determining variations in the angular and lateral alignment of the beam; and
means for independently correcting for the changes in the angular and lateral alignment of the beam within the resonator.

11. A laser as recited in claim 10 wherein said means for determining variations in the angular and lateral alignment of the beam includes a pair of position detectors located outside of said resonator and a lens spaced from one of said detectors a distance equal to the focal length of said lens, such that changes in beam position measured on said one detector will be limited to those resulting from angular changes in the alignment of the beam.

12. A laser as recited in claim 11 wherein the distance between the laser and said lens is equal to the distance between said laser and the other position detector.

13. A laser as recited in claim 10 wherein said correcting means includes varying the angles of said mirrors and wherein the angle of one of said mirrors is varied to correct the angular alignment of the beam and angle of the other mirror is used to correct the lateral alignment of the beam.

14. A method of optimizing the performance of a laser, said laser having a resonator defined by a pair of mirrors, said laser including a gain medium located within the resonator, said laser further including a means for exciting the gain medium to generate a laser beam, said method comprising the steps of:
independently determining variations in the angular and lateral alignment of the beam; and
independently correcting for the changes in the angular and lateral alignment of the beam within the resonator.

15. A method as recited in claim 14 wherein the angular alignment of the beam is corrected by adjusting the angle of one of said mirrors and the lateral alignment is corrected by adjusting the other mirror.

16. A method as recited in claim 14 wherein said determining step is performed by measuring the position of the beam outside of the resonator with a first position detector and measuring the position of the beam with a second position detector located outside the resonator and in the focal plane of a lens so that positional information measured by said second detector will be solely the result of angular changes in the beam.

* * * * *